United States Patent [19]

Long

[11] Patent Number: 4,667,232
[45] Date of Patent: May 19, 1987

[54] SYNCHRONIZING PULSE RESTORATION CIRCUIT

[75] Inventor: Michael E. Long, Western Springs, Ill.

[73] Assignee: Zenith Electronics Corporation, Glenview, Ill.

[21] Appl. No.: 722,862

[22] Filed: Apr. 11, 1985

[51] Int. Cl.$^4$ .................... H04N 7/167; H04N 5/08
[52] U.S. Cl. ................................ 380/15; 358/156; 358/139; 380/17
[58] Field of Search ............ 358/120, 124, 150, 172, 358/153, 155, 156

[56] References Cited

U.S. PATENT DOCUMENTS

| 4,222,068 | 9/1980 | Thompson | 358/120 |
| 4,257,065 | 3/1981 | Papay | 358/124 X |
| 4,396,946 | 8/1983 | Bond | 358/120 |
| 4,590,519 | 5/1986 | Zelenz | 358/120 |

Primary Examiner—Stephen C. Buczinski
Assistant Examiner—Linda J. Wallace

[57] ABSTRACT

A decoder for a television signal encrypted with randomly inverted video and randomly suppressed sync pulses includes inverting and noninverting amplifiers for inverting the inverted video and a sync pulse restoration circuit for restoring suppressed sync pulses, all under control of decoder logic. A comparator is coupled to the noninverting amplifier and changes its output voltage in the presence of signal portions extending beyond the mid sync level of the video signal. The output of the comparator is connected to the emitter of a transistor that has its collector supplied through a voltage divider load from a source of blanking level voltage. The junction of the voltage divider receives the decoded video signal. The transistor is driven conductive in response to flyback pulses, corresponding to the occurrence of sync pulses, applied to its base. The transistor conducts only during sync pulse intervals and the level of the decoded video signal during these intervals is brought to a common point, thus restoring all sync tips to the same height. For negative noise spikes, the transistor is not driven conductive and the level of the decoded video signal is held at blanking level.

5 Claims, 2 Drawing Figures

4,667,232

SYNCHRONIZING PULSE RESTORATION CIRCUIT

BACKGROUND OF THE INVENTION AND PRIOR ART

This invention relates in general to synchronizing pulse restoration circuits and particularly to apparatus for use in restoring the sync pulses in suppressed sync encrypted television signals.

A common form of television signal encryption involves suppressing the synchronizing pulses and/or inverting the video information, both on a random basis. In order to receive a usable television signal, the viewer requires a decoder unit for restoring the suppressed synchronizing pulses and for decoding the video information. Random inversion of video and random suppression of sync provides a great deal more security against signal pirating than encryption on a systematic basis. Random suppressed sync and inverted video are therefore widely used by cable operators for controlling subscriber use of their television signals.

A problem arises when decoding and processing such signals because the suppressed sync is restored by adding (or substracting) a current to the baseband video signal during the sync interval to bring the top (blank level) of the synchronizing pulses to fixed level. Thus, the restored sync pulses are uniform in height. The regular signal with unsuppressed synchronizing pulses, on the other hand, may experience sync pulse compression with consequent reduction in the sync tip level due to nonlinearities in the system headend processing, modulation and subscribeer converter IF and video processing circuits. Thus in a decoded video signal, that is one with the suppressed sync restored, the restored sync tips and normal sync tips may be at differnet levels. While synchronization is not adversely affected, the AGC circuit in the television receiver, which sets the video signal level based upon the sync tip level, causes brightness changes in the display which appear as a very disturbing flicker.

Another difficulty in cable systems results from a test procedure used by many cable operators for testing the various cables. A relatively high amplitude RF signal of known characteristics is swept across the frequency band of the cable system, either on a random or on a continous basis, and the effects thereon caused by its transit throughout the system are monitored. Departures from normal patterns indicate trouble or a system malfunction and the need for corrective action. The RF signal has both positive and negative polarity peaks which may substantially exceed the video signal in one direction and be mistaken ofr a synchronizing pulse in the other direction. An erroneous synchronizing pulse can result in loss of synchronization of the display with very noticealbe disturbances in the picture presented to the viewer. Accordingly, there is a need in the art for a sync signal restoration circuit that solves the above problems.

OBJECTS OF THE INVENTION

A principal object of this invention is to provide an improved synchronizing pulse restoration circuit.

Another object of this invention is to provide a synchronizing pulse restoration circuit for a suppressed sync encrypted television signal that avoids flicker of the display.

A further object of the invention is to provide a synchronizing pulse restoration circuit that is immune to noise of sync pulse magnitude.

BRIEF DESCRIPTION OF THE DRAWINGS

Other objects and advantages of the invention will be apparent upon reading the following description in conjunction with the drawings in which.

DESCRIPTION OF THE PREFERRED EMBODIMENT

Figure 1:
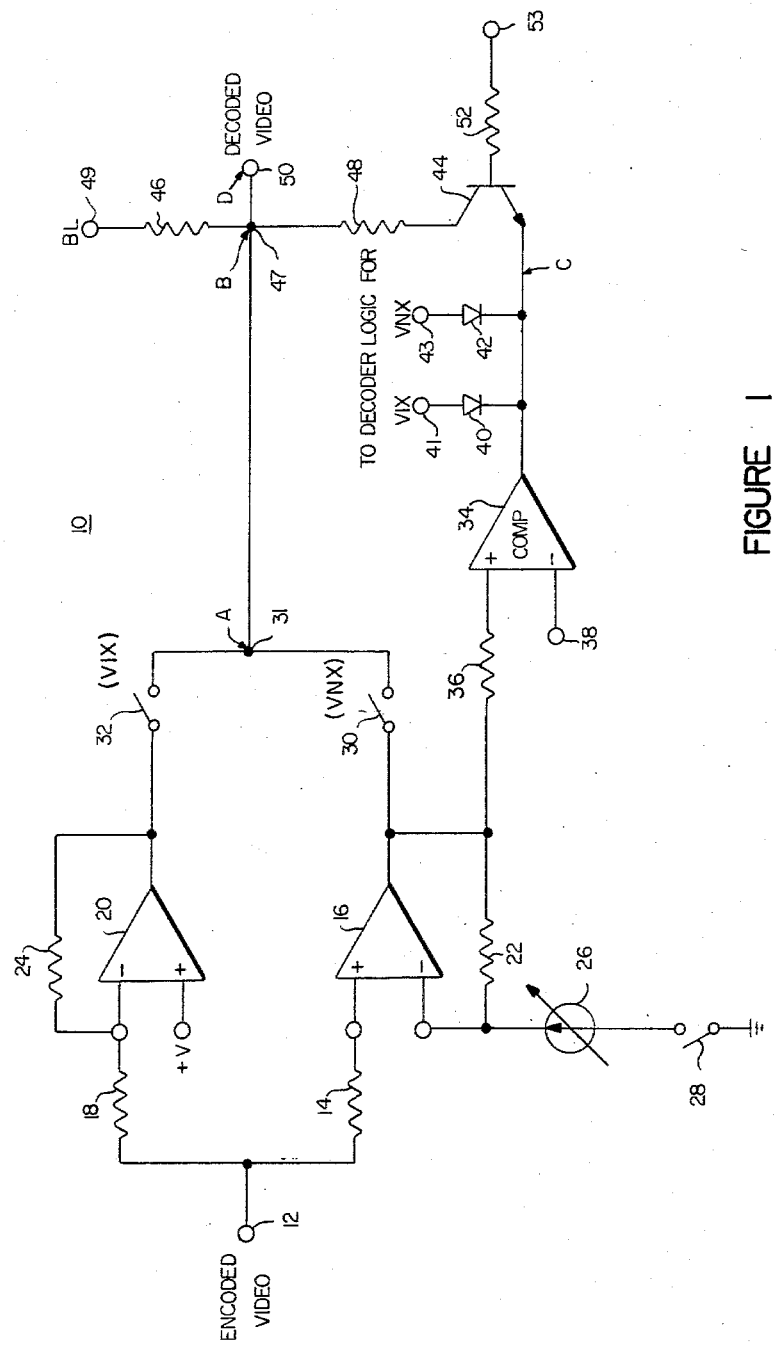
FIG. 1 is a schematic diagram showing the suppressed sync pulse restoration circuit of the invention.

Referring to FIG. 1, a portion of a decoder circuit for decoding a television signal that is encrypted with randomly inverted video and randomly suppressed sync is shown. It will be appreciated by those skilled in the art that it is common to control the decoders with logic circuitry that may include microprocessors. The techniques and apparatus for decoding such encrypted television signals is well known and will not be described in detail here. The encoded baseband video signal is applied to an input terminal 12 and thence through a resistor 14 to the positive input terminal of a noninverting operational amplifier 16 and through a resistor 18 to the negative input terminal of an inverting operational amplifier 20. The positive terminal of amplifier 20 is returned to a source of positive potential +V and the negative terminal of amplifier 16 is coupled to a variable curent source 26 which is controlled by blank level sensing circuits (not shown) and a sync pulse restorer switch 28 connected to ground. As indicated, switch 28 is operated under control of decoder logic (not shown) and is illustrated as a mechanical switch for purposes of description only. Current source 26 and switch 28 act on the input of non-inverting operational amplifier 16 to restore suppressed syncs at the output of operational amplifier 16. In practice, switch 28, as well as the other switches to be described in the circuit, is electronic and is under the control of the decoder logic.

A pair of feedback resistors 22 and 24 connect the negative input terminals to the output terminals of amplifier 16 and 20, respectively. The output of noninverting amplifier 16 is connected to a switch 30 labelled VNX and the output of inverting amplifier 20 is connected to a switch 32 labelled VIX. Switches 30 and 32 are connected together at a junction 31. As mentioned, switches 30 and 32 are also under control of the decoder logic with VNX representing normal video and VIX representing inverted video. The circuit, as thus far described, functions to identify when the video is inverted and when it is not inverted and to control switches 30 and 32 to decode the video and to replace (restore) suppressed sync pulses in their proper positions in the video waveform.

The output of noninverting amplifier 16 is connected through a resistor 36 to the positive input terminal of a comparator 34, the negative input terminal of which is connected to a terminal 38 that is supplied with a reference potential corresponding to a voltage between the blanking level of the baseband video signal and the sync tip level. This voltage is referred to as "mid sync" voltage. The output of comparator 34 is connected to the emitter of a transistor 44, the collector of which is connected through a pair of resistors 46 and 48 to a terminal 49 connected to a source of reference potential corresponding to the blanking level of the baseband video signal. The junction of resistors 46 and 48 is connected to junction 31 and, in turn, supplies an output terminal 50 at which the decoded video signal is present. The base of transistor 44 is connected through a resistor 52 to a terminal 53 which is supplied with flyback voltage pulses, that is, pulses of voltage which occur in time with the sync pulses. The output of comparator 34 is also connected to the cathodes of a pair of diodes 40 and 42 having anodes connected to a pair of terminals 41 and 43, respectively. As indicated, the diodes are connected in a logic "OR" configuration to the decoder logic for VIX and VNX, respectively.

As will be shown, the circuit just described functions to remove all synchronizing tips from the decoded baseband video signal appearing at terminal 31. In the absence of a synchronizing pulse, if interfering signal video levels such as noise or RF sweep energy occur below the mid-sync reference level, the circuit sets the output decoded video voltage to a blanking level determined by the voltage applied to terminal 49, effectively removing such interfering signals. With the output of comparator 34 at a high level during occurrence of video, diodes 40 and 42 are cut off and transistor 44 is cut off and potential at junction 47 and the output terminal 50 is determined by the video signal since one of the switches 30 and 32 is closed. Should the output of comoparator 34 go to ground, which occurs for a voltage in excess of the mid sync reference applied to terminal 38, diodes 40 and 42 conduct and disable both VIX and VNX logic signals. Thus both switches 30 and 32 will be open and no video is applied to terminals 31 and 47, the potential of which is then determined by the blanking level reference voltage applied to terminal 49. Although transistor 44 has its emitter grounded because the output of comparator 34 is at ground, its base electrode is not forwardly biased and transistor 44 remains cut off. During occurrence of a sync pulse, however, when the output of comparator 34 goes to ground a flyback pulse is also present at terminal 53 to drive transistor 44 conductive. In that event, the voltage at junction 47 and at output terminal 50 is determined by the ratio of resistors 46 and 48 and is lower than the blanking level reference voltage applied to terminal 49. Thus, during occurrence of a sync pulse, a negative voltage constituting the restored sync pulse is imposed on the video waveform. Thus, all sync pulses are restored at a constant level in the video waveform and not just the ones that were suppressed. Therefore all of the sync tips in the decoded video are at the same level and the flicker mentioned above is eliminated.

Any negative noise pulses which may be mistaken for sync pulses by comparator 34 are clipped at blanking level, since transistor 44 is not conductive except during occurrence of sync pulses. Consequently, the noise energy mentioned above is not recognized as a sync pulse and false synchronization from this source is avoided.

Figure 2:
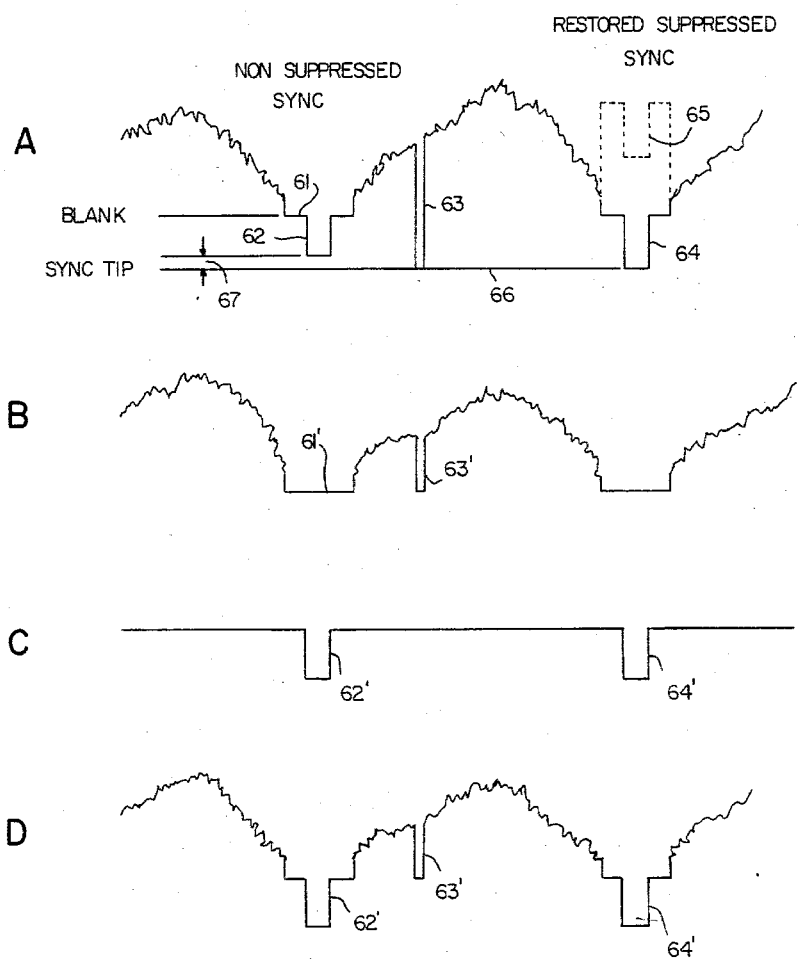
FIG. 2 depicts video waveforms useful in explaining the operation of the circuit of the invention.

The waveforms of FIG. 2 are illustrative of those which would appear were the circuit functions isolated and considered individually. Waveform A is indicated as appearing at terminal 31 and is seen to constitute a decoded baseband video signal having a blanking level 61, a sync pulse 62, a noise spike 63 and a restored sync pulse 64. A suppressed pulse 65 is indicated in dotted lines and sync pulse 64 should be understood as being the restored or replaced pulse for suppressed pulse 65.

A sync tip level 66 is shown for the restored sync tip and an offset level 67 indicates the difference between sync tip height of a nonrestored sync pulse 62 and a restored sync pulse 64. This offset, it will be recalled, is the cause of the flicker that results from application of such a decoded video signal to a television receiver.

Waveform B represents the result of operation of the inventive circuit in the absence of flyback pulses, that is, with transistor 44 cut off. Everything below the blanking level 61' has been clipped including noise spike 63 as indicated by 63'. Waveform C is a result of conduction of transistor 44 during occurrence of a sync pulse and provides new sync pulses 62' and 64' of a height determined by the resistorsin the load circuit of transistor 44. Waveform D represents the decoded video signal as produced by the circuit of the invention with the new sync pulses 62' and 64' with sync tips of the same height and with negative-going noise pulse 63 represented by 63' which is limited to the blanking level. Thus, the flicker problem mentioned above is avoided since all sync tips are at the same height and false synchronization is avoided since the negative-going noise is clipped at a level where is cannot be mistaken for a sync pulse by subsequent circuitry.

What has been described is a novel synchronizing pulse restoration circuit for a suppressed sync encrypted television signal which solves the problems of the prior art. It will be recognized that numerous changes in the described embodiment of the invention will be apparent to those skilled in the art without departing from its tru spirit and scope. The invention is to be limited only as defined in the claims.

What is claimed is:

1. A sync pulse restoration circuit for a decoder comprising.
   means for developing a baseband video signal that includes restored sync pulses and normal sync pulses of different heights;
   comparator means for stripping portions of said signal that extend beyond a mid sync level to video blanking level, said mid sync level corresponding to a level between said video blanking level and sync tip level; and
   means for replacing stripped signal portions, corresponding only to sync pulses, with pulses of uniform height whereby a restored siognal of uniform sync tip level, without noise exceeding said video blanking level, is produced.

2. The circuit of claim 1 further including:
   a transistor coupled to the output of said comparator means, and having a load circuit;
   a video signal processor for supply a decoded video signal to said load circuit, said transistor being nonconductive except during occurrence of a sync pulse; and
   means responsive to said comparator determining a signal in excess of said mid sync level for isolating said video signal processor from said load circuit.

3. The circuit of claim 2 wherein said transistor is supplied with flyback pulses for driving it conductive only during occurrence of sync pulses, said load circuit establishing a fixed voltage for said decoded video signal during conduction of said transistor whereby said replaced sync pulses in said decoded video signal are of uniform height.

4. In a television decoder circuit of the type including a suppressed sync pulse restorer and a video inverter and logic means for controlling operation of the restorer and the inverter to develop a decoded baseband video signal with both restored and normal sync pulses, the improvement comprising:

comparator means for determining the presence of signal portions beyond a mid sync level, said mid sync level corresponding to a level between blanking level and sync tip level;

means for stripping signal portions in excess of said mid sync level to video blanking level; and means operable only during the occurrence of a sync pulse and responsive to said comparator means for replacing both restored and normal sync pulses with new sync pulses of constant height and for eliminating noise in excess of said video blanking level.

5. The decoder of claim 4 further including:

an output terminal for the decoded video signal;

a transistor including resistive means in its load circuit, said resistive means being coupled to said output terminal;

means supplying said resistive means with a voltage corresponding to a desired blanking level for said decoded video signal;

means coupling the output of said comparator to said transistor; and means supplying the input of said transistor with a turn on voltage when a sync pulse is determined.

* * * * *